Patented Sept. 13, 1949

2,482,070

UNITED STATES PATENT OFFICE 2,482,070

RESIN-WAX COMPOSITION

Daniel Schoenholz, Bronx, and Leon Kresser, Brooklyn, N. Y., assignors to Foster D. Snell, Inc., a corporation of New York No Drawing. Application June 26, 1946, Serial No. 679,585

7 Claims. (Cl. 260—22)

This invention relates to a wax and resin dispersion in aqueous medium and to the wax and resin composition suitable for use in making the dispersion.

The invention is particularly useful in providing bright drying water dispersion floor waxes and will be first illustrated, therefore, by description in connection with such wax compositions.

Carnauba wax and other waxes such as ouricuri and candelilla are widely used in the manufacture of water dispersion floor waxes for linoleum, wood flooring and other flooring materials. In this application carnauba wax is the preferred material. Since carnauba wax is expensive, it is generally extended with other waxes including those mentioned for the purpose of achieving a lower cost material. In the attempt to lower the cost of these wax preparations in order that less of the more expensive waxes may be used various resins have also been blended with these waxes. Thus there have been blended with carnauba or candelilla wax, or a mixture of the two, such resins as the polyterpenes, terpene phenolics, certain other phenolics, and heat treated congo gums.

In addition, alkaline solutions in water of such resins as shellac, Manilla copal, and other resins have been admixed with wax or wax resin dispersions both for the purpose of lowering costs and enhancing certain desirable performance properties.

In the use of the aforementioned resins to which we have referred as being used in blends with waxes, certain disadvantages exist. The compositions usually require a high pH to produce suitable dispersions which is injurious to flooring compositions and results in making the finish too readily redispersible in water. When used in sufficient amount to give a substantial lowering in cost, the resins result in tacky films and are difficult to disperse. No one of these resins combines all the desirable properties of low cost, ease of dispersion, lack of tack, good color, freedom from dirt, uniformity of behavior, and wide compatibility, in a single material.

We have now discovered that certain salts of a special type of resin are compatible with carnauba wax, other waxes, and resins hereinafter stated, in the finished film, and also that the resin from which these salts are made is itself compatible with these waxes and resins, so that there may be made a mixture of the resin and the wax for conversion to the salt of the resin on dispersion of the mixture in an alkaline dispersing medium.

Using our composition, we find it is possible to prepare lower cost, high resin content dispersions which dry with a glossy film without the necessity for buffing. These dispersions may have pH values below 10, are non-critical with respect to the manufacture of the dispersion, and are compatible with a greater variety of waxes and resins than the resins heretofore used.

Briefly stated, the invention comprises an emulsion of a wax of which carnauba is the preferred example and a salt of the complex or adjunct of maleic anhydride with the abietate of a polyhydric alcohol, a preferred example of the complex being an amine salt of the combination of maleic anhydride with glyceryl abietate. The invention comprises also such an emulsion in which there is used a dispersing or emulsifying agent, as an amine or ammonium soap type of which triethanolamine oleate and ammonium oleate are examples. If desired, film forming resin solutions such as shellac or Manila copal solutions may be used for the purpose of obtaining various modifications of properties.

In one embodiment the invention comprises carnauba wax and the complex of maleic anhydride with the abietate of the polyhydric alcohol, the two materials being dissolved in each other and constituting a polish base which may be melted and then readily dispersed in water containing an organic alkali and suitably also an emulsifying agent, to give a dispersion of the kind described.

Abietic acid may be written as follows:

The groups represented by $C_{14}H_{19}$ contain conjugated double bonds. Although it is to this $C_{14}H_{19}$ part that the acid or carboxyl group COOH is attached, this group is shown at the left in the formula for convenience in illustrating in subsequent formulas the reaction of this group and also the $C_{14}H_{19}$ with other materials.

In making our resin for use in extending the wax and improving the properties of the polishing film, we esterify the carboxyl group with a polyhydric alcohol. Also, we react maleic anhydride with the part of the molecule represented by $C_{14}H_{19}$, so as to form an adjunct of the maleic anhydride with glyceryl abietate, the product being a maleicized ester. Then we neutralize with a selected alkali part at least of the acid groups of the maleic anhydride which up to this point have remained free. The result is a selected alkali salt of a complex or adjunct of the anhydride with the abietate of the selected polyhydric alcohol. When glycerine is the polyhydric alcohol used, the complex may be represented generally by the following formula showing the proportion of the several radicals or groups:

In this formula, the union of the maleic anhydride (which in the formula is converted to a salt of maleic acid) to $C_{14}H_{16}$ group is indicated by the double bond ( : ) and R represents an equivalent weight of the radical of a selected alkali. When triethanolamine, for instance, is used as the organic alkali to neutralize the acidity of the maleic anhydride complex, then R would be the monovalent group $+NH(C_2H_4OH)_3$.

A more general type formula for the organic alkali salts of the maleic acid complex may be written as follows:

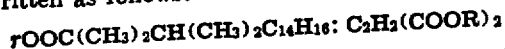

In this formula $r$ represents an equivalent weight of the radical or residue of a polyhydric alcohol as, for instance, ½ mol of ethylene glycol less the hydroxyl groups, ⅓ mol of glycerine less the hydroxyl groups, or ¼ mol of pentaerythritol less the hydroxyl groups.

The composition of the maleic anhydride complex with glycerine may be represented as follows:

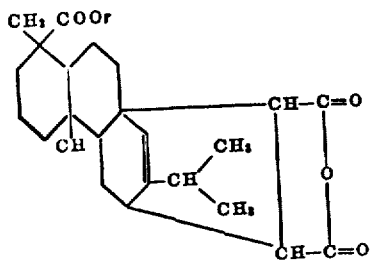

$r$ in this instance represents ⅓ $C_3H_5$, that is, the equivalent weight of the glyceryl radical. Expressed differently, the formula for a whole molecule would be $C_3H_5X_3$, X representing all of the immediately preceding formula except the $r$.

When the complex represented by the above formula comes into contact with a warm aqueous solution of an alkali such as an amine $(R.NH_2)$, the anhydride groups on the right side of the formula given above are converted to salts, by a reaction which may be represented as follows:

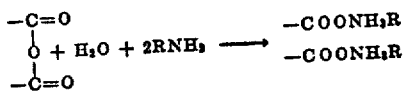

As the alkali used to neutralize the acidity represented by the anhydride, or by the acid COOH groups after contact with water, there is used one that is water soluble. Particularly satisfactory results are obtained when the alkali is a soluble amine. Examples are a lower alkylamine, as, for instance, methyl, ethyl, or propylamine; an alkylolamine of which good examples are the mono-, di-, or triethanolamine, diethylethanolamine, and 2-methyl 2-amino propanol. Another nitrogenous base that may be used is ammonia, although ammonia and alkali metal hydroxide, which may also be used as the alkali, are not as satisfactory as are the amines.

The wax to be used should be one that is conventionally used in polishing compositions of the class for which the present composition is to be used as a replacement. For convenience such wax may be called a polishing wax, which means that, when properly compounded and applied as a thin film, in conventional manner, it gives a polish. The wax should be of satisfactory color, ordinarily light in color, non-tacky, and stable on exposure to air. Carnauba wax is the preferred example. Other waxes that may be used are candelilla, ouricuri, oxidized petroleum wax, microcrystalline petroleum wax, and macrocrystalline petroleum wax, either alone or mixed with each other or with carnauba. These waxes are known to be insoluble in water For a description of ouricuri emulsions in water, see U. S. Patent 2,383,451, issued to Cothran.

Examples of polyhydric alcohol that may be used are the di-, tri-, or tetrahydric alcohols, as, for instance, ethylene glycol, diethylene glycol, propylene glycol, glycerine, and pentaerythritol. When a composition that dries to give a bright film without polishing is not required, a monohydric alcohol may be used. Thus for such use of the emulsion, $r$ in the formula above may be methyl, ethyl, or butyl.

The abietic acid which is used in making the abietate of the polyhydric alcohol may be substantially pure abietic acid but for economical commercial operations should be rosin or the resin acids fraction of tall oil.

The proportion of maleic anhydride to the abietate such as ester gum is suitably about 5 to 32 parts for 100 parts of the abietate. Best results are obtained within the range 9 to 30 parts.

Of the salt of a maleic anhydride complex of the abietate of polyhydric alcohol we use up to the amount found by test to be compatible with the wax. When the salt used is the amine salt, there may be used as much as 75 parts or slightly more of the salt to 100 parts total weight of the salt and wax. Even in such large proportion, the amine salts are compatible with the wax, there is no instability of the dispersion in water, and no separation from the wax in the finished polishing film after evaporation of the water serving initially as the dispersion medium. For best results, we use about 20 to 45 parts of the salt to 100 of total weight of the salt and wax.

In general the dispersion of the present invention is made as follows:

The wax and the salt of the complex or adjunct of maleic acid with ester gum or like abietate of a polyhydric alcohol are warmed to a temperature above the melting point and stirred into water containing an organic alkali and also an emulsifying agent. If desired the wax and maleic acid complex from which the salt is to be made may be first melted together. In fact it is convenient, in commercial use of the invention, to melt together the wax and the maleicized ester gum or the like and then allow the mixture to solidify in containers for distribution, the solidified mass being remelted at the time of mixing into the aqueous dispersion medium.

As the emulsifying agent used in making the emulsion, a soap is preferred. Suitable examples are an alkali metal or an amine soap of a higher fatty acid, the oleates being particularly satisfactory. Other emulsifying agents may be used, as, for instance, salts of the sulfated alcohols, other synthetic emulsifying agents such as the mannitan and sorbitan palmitate, and a polyglycol monooleate.

If a solution of an additional film forming ingredient is to be used it may be incorporated at the time of forming the emulsion or by addition to the finished emulsion. Such film forming ingredient should be alkali soluble, that is, dispersible in aqueous alkali solution. Examples of such ingredients that are satisfactory are shellac, casein, and the fusion product of zein and rosin.

In place of the organic alkali used in forming the salts of the maleicized abietate of the polyhydric alcohol, there may be used an inorganic alkali, as, for instance, sodium carbonate, potassium hydroxide, or borax. Much better results are obtained, however, when the alkali used at this stage is an organic alkali and the use of inorganic alkalies is not recommended except that borax in conjunction with an organic alkali is very desirable.

In any case the pH of the final composition should not be much above 10 so as to prevent deteriorating effect of the composition on conventional flooring to which it may be applied and also to avoid objectionable redispersibility of the film in water.

The bright drying dispersions of the present invention are adapted for use also in other industries than floor waxes, as, for instance, for shoe polishes in which case suitable dye or pigment is incorporated, as a coating material for paper, and also as a wax coating for fruits.

In making the bright drying floor wax composition that forms a glossy film without rubbing, there may be used various proportions of non-volatile material to water in the dispersion finally applied to the floor. A suitable proportion is 10 to 30 parts of non-volatile materials to 100 parts of total weight. In making a paper-coating, on the other hand, the proportion of non-volatile materials should be increased to the amount required to give suitably thick coating in a single application.

The invention will be further illustrated by detailed description in connection with the following specific examples or steps in the practice of it.

EXAMPLE 1

Making maleicized resin

Commercial glyceryl abietate of the grade known as ester gum was used as the abietate of the polyhydric alcohol. This ester gum had a softening point by the ball and ring method of 140° to 160° F., acid number 6 to 8, and saponification value 70 to 75. The ester gum was melted and held at a temperature of 320° to 355° F. until foaming due to the expulsion of air and water had subsided.

For each 32 parts by weight of the remaining product there was admixed 3 parts of technical maleic anhydride. Heating was continued and the resulting mixture held at a temperature of 320° to 356° F. until foaming ceased. This required 10 to 15 minutes.

The product was maleicized ester gum. It had a ball and ring softening point of 213° F., an acid value of 25 to 40, and saponification value 175.

EXAMPLE 2

Blending maleicized ester gum with waxes

The maleicized ester gum made as described in Example 1 was then melted with various resins and waxes to give compositions of percentages by weight shown in the following table:

| Preparation No. | 1 | 2 | 3 | 4 | 5 | 6 | 7 | 8 | 9 | 10 |
|---|---|---|---|---|---|---|---|---|---|---|
| Maleicized ester gum | 35 | 35 | 35 | 35 | 35 | 35 | 35 | 30 | 65 | 25 |
| Ester gum | 30 | 30 | 30 | | | | | | | 20 |
| Phenol terpene resin | | | | | | | | | | |
| Carnauba wax | 20 | 20 | | 30 | 30 | 30 | 30 | | | |
| Candelilla wax | 10 | | | 20 | | | | | | |
| Ouricuri wax | | | | | 10 | | | | | |
| Pentaerythritol stearate | | | | | | | | 20 | 11 | 35 |
| Oxidized petroleum wax | | | | | | | | | | |
| Petroleum wax | 5 | 10 | 30 | 5 | 10 | 30 | 10 | 9 | | 15 20 |
| Total weight | 100 | 100 | 100 | 100 | 100 | 100 | 100 | 100 | 100 | 100 |

Each of the above blends, when melted and stirred with the dispersion medium including water, a soap constituting the emulsifier, and an organic alkali of the kind described, gives a good dispersion in which the blend is the dispersed phase. Furthermore, the dispersion when applied and allowed to dry upon linoleum, sealed wood, terrazzo pavement, or asphalt or rubber tile, dries with a high lustre.

EXAMPLE 3

Preparation of dispersion

One hundred parts of any wax resin blend such as shown in the table of Example 2 is melted in a steam jacketed kettle provided with a mechanical agitator. The blend is warmed to and maintained at a temperature of 200°–210° F. and there is stirred in 7.5 parts of oleic acid and 9 parts of triethanolamine. The oleic acid and a part of the triethanolamine react to form a soap which acts as the surface tension lowering or emulsifying agent when water is later added. There is then added a solution of 4 parts of additional triethanolamine in 6 gallons of water at 200° to 210° F., this amine along with the excess over the oleic acid previously added serving to neutralize the acidity of the maleicized ester gum present in the wax and resin blend initially melted in the kettle. The whole is then stirred at 200° to 210° F. and there was then added additional water at this same temperature, the water being added slowly with vigorous stirring so as to insure uniform incorporation into the batch as the water is added and the water being added in the amount of 900 parts by weight. This gives an emulsion containing approximately 12% of solids.

EXAMPLE 4

In place of the ester gum used in Example 1 there is substituted an equal proportion of the substantially neutral ester of ethylene glycol with rosin or of pentaerythritol with rosin. The procedure of Example 1 is then followed and the product obtained is substituted on an equal weight basis in the procedures of Examples 2 and 3.

EXAMPLE 5

The procedure of Example 3 is followed except that the triethanolamine used therein is substituted by an equivalent weight of any of the other organic alkalies disclosed above.

EXAMPLE 6

There is made a warm melted blend at 200° to

210° F. of the following ingredients, all proportions being shown as parts by weight.

| | Parts |
|---|---|
| Glyceryl ester gum | 26 |
| Maleicized ester gum (maleic anhydride adjunct of ester gum) | 30.5 |
| Carnauba wax No. 3 (North Country) refined | 17.5 |
| Oxidized petroleum wax | 13 |
| Oleic acid | 6.75 |
| Triethanolamine | 8.25 |

The blend so made is then stirred up with a solution containing 3.3 lbs. of 70% monoethylamine in 25 parts of water, the solution being at 180° F.

To the mixture so made there is then stirred in 360 parts of water at 200° to 210° F. and then 360 parts of cold water at tap temperature, 50°-75° F.

EXAMPLE 7

The procedure of the above numbered examples is followed except that the oleic acid and preferably also the amount of the amine which corresponds thereto is replaced by a synthetic surface active agent or emulsifier. Thus there is used the sodium alkyl sulfate, mannitan palmitate, or the polyglycol monoleate, in the proportion of about 1 part for 100 parts of finished composition.

EXAMPLE 8

The addition of borax, which is particularly helpful in improving the qualities of the emulsion which is to dry to a bright finish without buffing, is illustrated in this example.

As the wax resin blend there was selected any one of those listed in the columns 1-10 in the table above.

100 parts of the selected wax resin blend was melted in a jacketed kettle provided with a mechanical agitator, the temperature raised to 200° to 210° F. and 7.5 parts of oleic acid and 9 parts of triethanolamine were stirred in.

Then there was added a solution of 7.5 parts of borax in 50 parts of water at 200° to 210° F. The whole was stirred until the solution was thoroughly incorporated into the batch.

Then there was introduced sufficient additional water to make a total of 900 parts of water added, this water being added at 200° to 210° F., slowly and with vigorous agitation.

The result is an emulsion containing approximately 12% of non-volatile materials which remain behind when the emulsion is applied to a surface and the water caused to evaporate.

EXAMPLE 9

An emulsion that is satisfactory for many purposes is prepared by using an alkali metal hydroxide as the alkali to neutralize the maleic anhydride adjunct of the glyceryl abietate. The present example illustrates this use.

Part A was prepared by making a blend at 200°-210° F. of the following materials:

| | Parts |
|---|---|
| Glyceryl ester gum | 27 |
| Maleicized ester gum | 32 |
| Oxidized petroleum wax | 14 |
| Carnauba #3 N. C. Ref | 18 |

Into this blend at 200°-210° F. there was mixed first 8 parts of sodium soap, then 2.7 parts of sodium hydroxide in 25 parts of water, and finally and at the same temperature 722 parts of water, the water being added slowly at first and then more rapidly and with continued stirring after the inversion of phase which occurs during the addition of the water.

EXAMPLE 10

28 parts of maleicized ester gum, 24 of ester gum, 20 of carnauba wax, and 12 of oxidized petroleum wax were blended at 200° to 210° F.

Into this blend at the same temperature, there were introduced 6.25 parts of oleic acid.

Then there were introduced, at 150° F., 5 parts of aqua ammonia (28% concentration) in 25 of water, then, at 190° F., 2.5 parts of aqua ammonia (28%) in 350 of water, and finally, at 50°-75° F., 257½ parts of water.

Vigorous agitation was maintained at all times. The rate of addition was slow for the ammonia solution and rapid for the cold (50°-75°) water.

EXAMPLE 11

Borax was used in place of part of the ammonia of Example 10, by adding to the melted wax resin blend and fatty acids a solution of 6½ pounds of borax and 25 pounds of water at 210° F. The ammonia additions are limited to 2.5 parts at 150° F. and 1.5 parts of ammonia at 190° F.

Other conditions and proportions are essentially as described in Example 10.

The products made as described are much less expensive per pound than carnauba wax, are conveniently prepared and used and effective in their results. They give non-tacky films that are evidently homogeneous and develop a high gloss without the need of buffing or otherwise polishing the film after the evaporation of the volatile dispersion medium.

The organic alkali salts of the maleic anhydride adjunct are dispersible in boiling water, stable, and are appreciably soluble in water to give moderately alkaline solutions, as, for instance of pH 9 to 11 for solutions of 1% concentration of the salts.

It will be understood also that it is intended to cover all changes and modifications of the examples of the invention herein chosen for the purpose of illustration which do not constitute departures from the spirit and scope of the invention.

What we claim is:

1. An emulsion comprising a water-insoluble polishing wax, a salt of a water soluble nitrogenous alkali with the maleic anhydride adjunct of the abietate of a polyhydric alcohol, water, and an emulsifying agent dissolved in the water, the wax and the said salt being soluble in each other and being present in the emulsion as the dispersed phase and the salt being in the proportion of 20 to 75 parts to 100 parts of the salt and wax.

2. An emulsion comprising a water-insoluble polishing wax, a salt of a water soluble nitrogenous amine with the maleic anhydride adjunct of the abietate of an aliphatic alcohol, water, and an emulsifying agent dissolved in the water and serving to improve the fineness of dispersion of the wax and said salt, the wax and the said salt being soluble in each other and being present in the emulsion as the dispersed phase and the salt being in the proportion of 20 to 75 parts to 100 parts of the salt and wax.

3. A polishing composition comprising the emulsion described in claim 1, the said emulsifying agent being a water soluble fatty soap dissolved in the water.

4. A composition suitable for use as the base for a polish, the composition comprising a water-insoluble polishing wax and a salt of a water soluble nitrogenous alkali with the maleic anhydride adjunct of the abietate of a polyhydric alcohol and the proportion of the said salt being 20 to 75 parts for 100 parts of the salt and wax.

5. A composition suitable for use as the base for a polish, the composition comprising a water-insoluble polishing wax and the salt of a nitrogenous alkali with the maleic anhydride adjunct of glyceryl abietate and the proportion of the salt being 20 to 75 parts to 100 parts of the salt and wax.

6. A composition suitable for use as the base for a polish, the composition comprising carnauba wax and the salt of a nitrogenous base with the maleic anhydride adjunct of glyceryl abietate in the proportion of 20 to 75 parts of the salt to 100 parts of the salt and wax.

7. A polishing composition comprising an aqueous solution of a soap, carnauba wax, and the salt of a water soluble alkylolamine with the maleic anhydride adjunct of glyceryl abietate, the wax and said salt being dispersed in the said solution, the pH of the solution being not above 11, and the proportion of the salt being 20 to 75 parts to 100 parts of the salt and wax.

DANIEL SCHOENHOLZ.
LEON KRESSER.

REFERENCES CITED

The following references are of record in the file of this patent:

UNITED STATES PATENTS

| Number | Name | Date |
|---|---|---|
| 1,967,220 | Barrett et al. | July 24, 1934 |
| 2,025,947 | Humphrey | Dec. 31, 1935 |
| 2,245,100 | Berstein | June 10, 1941 |